April 12, 1960

O. JENSEN 2,932,708

EXPLOSIVE TYPE SHORT CIRCUITER

Original Filed Aug. 12, 1957

April 12, 1960     O. JENSEN     2,932,708
EXPLOSIVE TYPE SHORT CIRCUITER
Original Filed Aug. 12, 1957     5 Sheets-Sheet 2
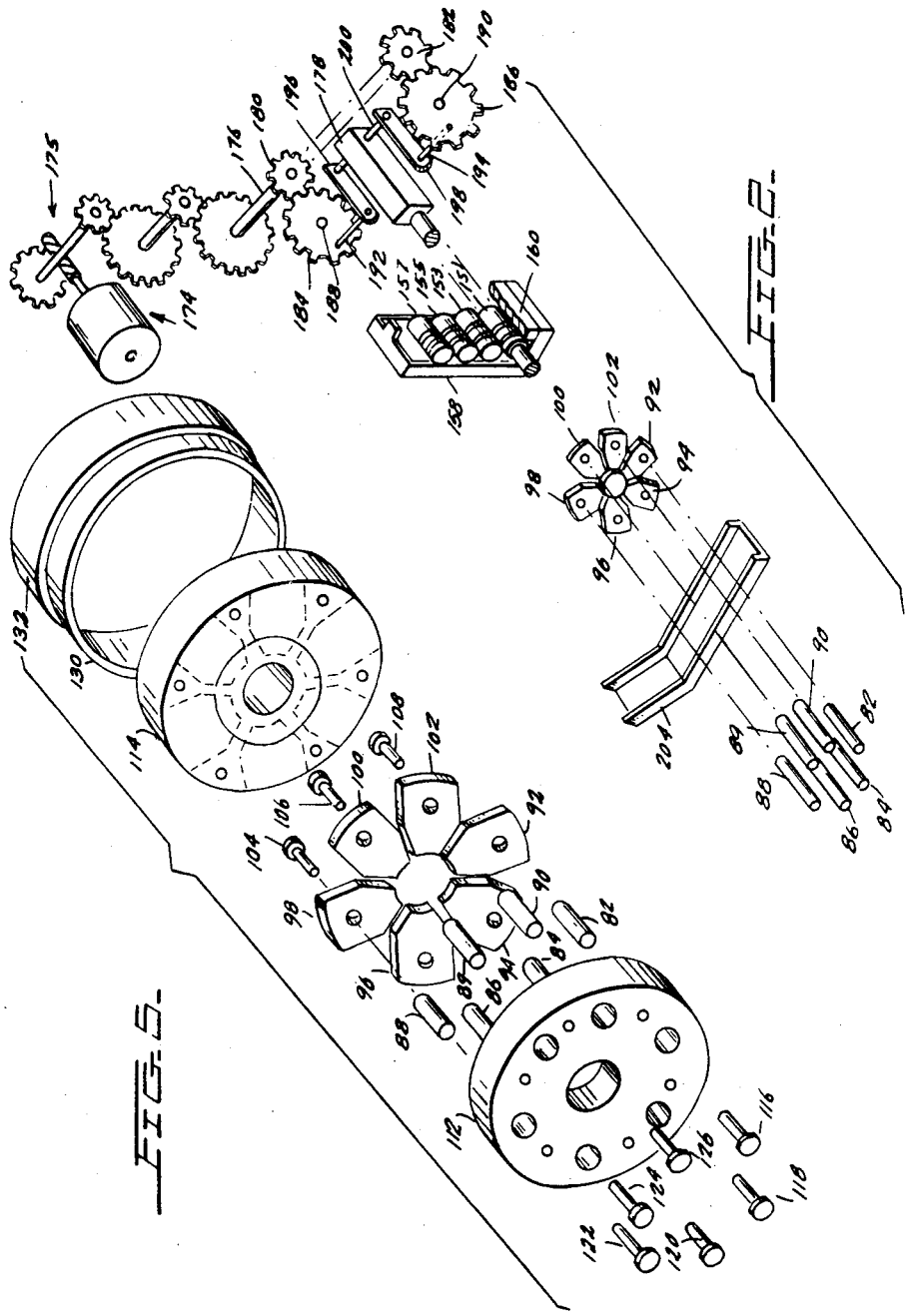

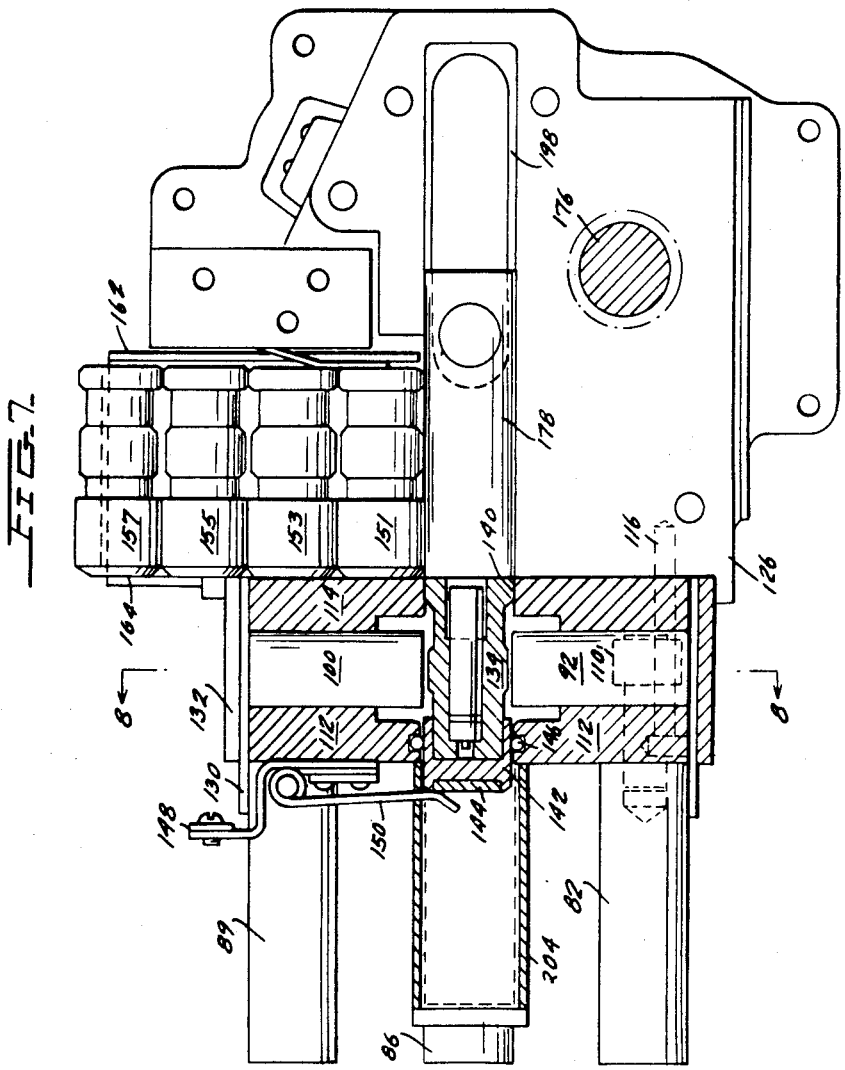

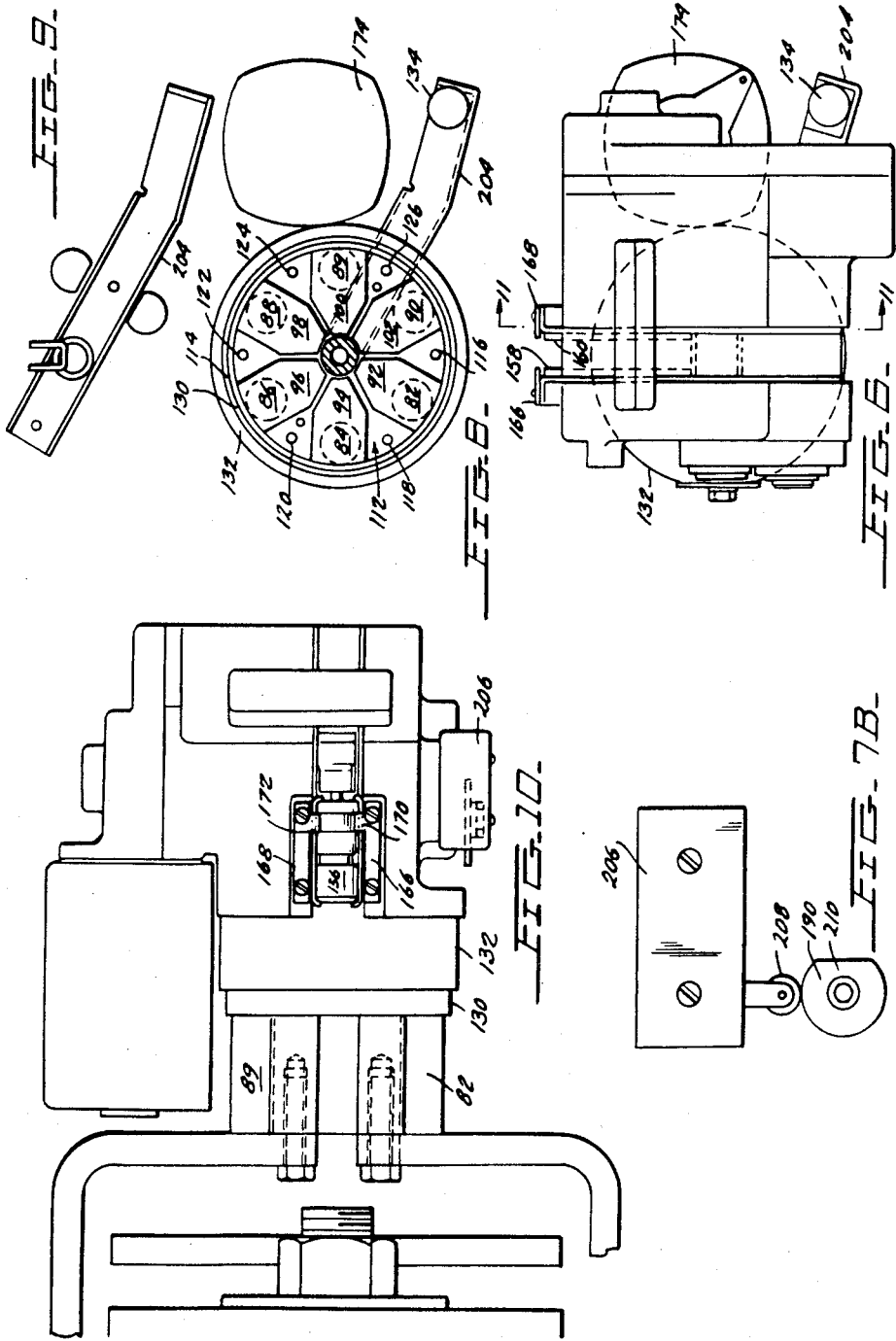

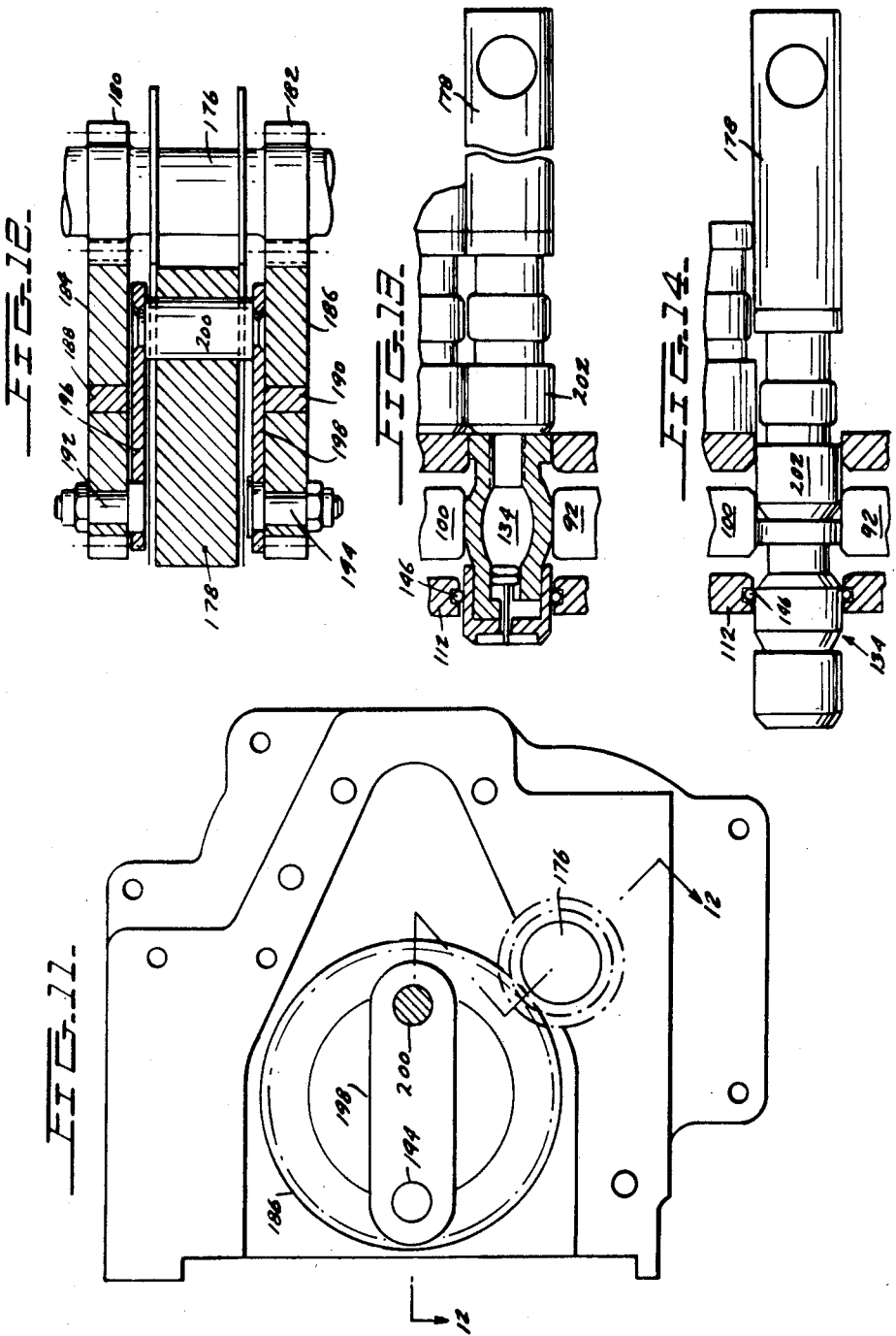

United States Patent Office 2,932,708
Patented Apr. 12, 1960

2,932,708

EXPLOSIVE TYPE SHORT CIRCUITER

Otto Jensen, Malvern, Pa., assignor to I-T-E Circuit Breaker Company, Philadelphia, Pa., a corporation of Pennsylvania Original application August 12, 1957, Serial No. 677,631, now Patent No. 2,888,538, dated May 26, 1959. Divided and this application August 19, 1958, Serial No. 755,956

4 Claims. (Cl. 200—126)

My invention relates to a short circuiter device for short circuiting electrical components responsive to predetermined conditions, and is more specifically directed to a short circuiter wherein an explosive charge is detonated to cause a pair of contacting surfaces to engage and thereby cause the required short circuit. This application is a division of my copending application Serial No. 677,631 filed August 12, 1957, now Pat. No. 2,888,538, entitled Explosive Type Short Circuiter.

Short circuiting devices are commonly used in conjunction with protective equipment for electrical apparatus which is unable to withstand severe fault currents. Thus, responsive to a fault condition, a short circuiter which includes a pair of cooperating contacting surfaces may be caused to close a short circuit across the electrical equipment to be protected responsive to the fault. Further protective equipment connected in series with the electrical equipment being protected may then subsequently be operated to remove the faulted electrical device from the line.

However, the short circuiter device operates within a small fraction of the time required for operation of the series connected interrupters, thus removing the faulted electrical equipment from undue current carrying requirements within a few milliseconds, rather than a fraction of a cycle which would be required by presently used interrupting devices.

Typical of electrical devices which are commonly protected by short circuiting equipment are the rectifier elements of a rectifier system. Thus, mechanical rectifiers which utilize contacts as their rectifying element and, as set forth in copending application Serial No. 307,067 filed August 29, 1952, now Patent No. 2,798,909 entitled Mechanical Rectifier Contacts in the name of Otto Jensen and assigned to the assignee of the instant invention are normally provided with short circuiter devices which immediately short circuit the electrical contacts responsive to backfire conditions, to protect all of the contacts until the A.-C. and D.-C. circuit breakers of the system are operated.

When the rectifying element of a rectifying system is of the semi-conductor or metallic type, such as the germanium or silicon rectifier, the use of extremely fast short circuiting devices is highly desirable, since it will allow the normal rated current of the rectifier elements to be increased beyond that when the rectifier system operates with slower protective equipment. This is true since one of the parameters in rating a metallic or semi-conductor rectifier element is the amount of time that the rectifier element will be subjected to fault currents.

Thus, by utilizing a short circuiter which is extremely rapid in operation, the amount of time that the rectifier element is subjected to short circuit conditions will be relatively small, and its rated current may be increased accordingly.

Short circuiting devices in the past have been commonly operated by a magnetic means wherein a fault condition on the electrical equipment being protected, such as a rectifier system, creates a fault signal responsive to fault conditions which causes the energization of an electromechanical system wherein a magnetic field is generated to drive two or more contact members into engagement, and thus achieve short circuiting.

This system, however, although being appreciably faster than the protective circuit breakers, has an inherent time delay due to the fact that energy must be built up immediately after the fault condition occurs, and thereafter must accelerate relatively large masses into contact engagement with respect to one another.

The essence of my invention is to eliminate this electromechanical system for driving the two cooperating surfaces of the short circuiter into engagement and to utilize an explosive charge which is detonated responsive to a fault condition on the equipment being protected. In this case, energy is stored within the explosive medium and need not be built up after the occurrence of a fault condition, as is true in the electromechanical devices.

Conversely, a low power signal created by the fault condition is sufficient to detonate the charge whereby a tremendous amount of power is immediately available for accelerating one contact surface with respect to the other to achieve subsequent short circuiting.

In one particular embodiment of my invention as applied to a multi-phase rectifier device, a plurality of terminals or contacts normally insulated from one another may be taken to respective rectifier elements and in front of the A.-C. source, and a second set of terminals are taken from the D.-C. side of the system. These elements are then positioned adjacent a cartridge which contains an explosive charge. The cartridge walls are made of conductive material and are further constructed to be expanded responsive to detonation of the charge.

The expansion of the cartridge walls will move it into engagement with the various terminals connected to the rectifier elements to thereby achieve the desired short circuiting of each rectifier element.

The time of operation with this short circuiting condition after reception of the detonaing signal is extremely small so that the contacts are protected until the various A.-C. and D.-C. interrupting equipment is operated.

While my invention as set forth herein is directed to a short circuiting device, it will be apparent to anyone skilled in the art that the structure set forth herein could be altered to form a contact interrupter.

Accordingly, the primary object of my invention is to provide a novel contact device.

Another object of my invention is to provide a novel high speed protective device for electrical equipment.

Another object of my invention is to provide a novel high speed contact device which is operated by an explosive charge.

A further object of my invention is to provide a novel high speed short circuiter wherein the movable contact of a short circuiter is comprised of a cartridge having expandable conductive walls, these walls being expanded responsive to the detonation of an explosive charge within the cartridge.

A still further object of my invention is to provide a novel short circuiter utilizing an explosive cartridge for the movable contact element wherein means for automatically ejecting an expanded cartridge and replacing it by a new cartridge are provided.

These and other objects of my invention will become apparent from the following description when taken in connection with the drawings, in which:

Figure 1 schematically illustrates a six-phase full wave mechanical rectifier circuit equipped with a short circuiter device and illustrates the use of the short circuiter.

Figure 2 is an exploded perspective view of my novel invention in conjunction with automatic reloading means.

Figure 5 is an exploded perspective view showing the manner in which the plurality of stationary contacts of my novel short circuiter may be housed.

Figure 6 is a side plan view of my novel short circuiter.

Figure 7 is a side cross-sectional view of the short circuiter of Figure 6.

Figure 7b illustrates the manner in which the drive motor shaft cooperates with a microswitch for automatically cutting off the motor once a new cartridge is inserted in the short circuiter.

Figure 8 shows a cross-sectional view of Figure 7 when taken across the lines 8—8.

Figure 9 is a fragmentary view of Figure 8 which specifically shows the positioning of the reject cartridge ramp.

Figure 10 is a top plan view of Figure 6.

Figure 11 is a side cross-sectional view of Figure 6 when taken across the lines 11—11 and specifically illustrates the manner in which the operating ram is driven from a driving motor.

Figure 12 is a cross-sectional view of Figure 11 when taken across the lines 12—12.

Figure 13 is a fragmentary view of my novel explosive cartridge after its walls have been expanded, and specifically shows the manner in which the conductive walls engage their corresponding stationary contact structure.

Figure 14 illustrates the ram position and cartridge position when a new cartridge is automatically inserted in the short circuiter device and a spent cartridge is being ejected.

Figure 1:
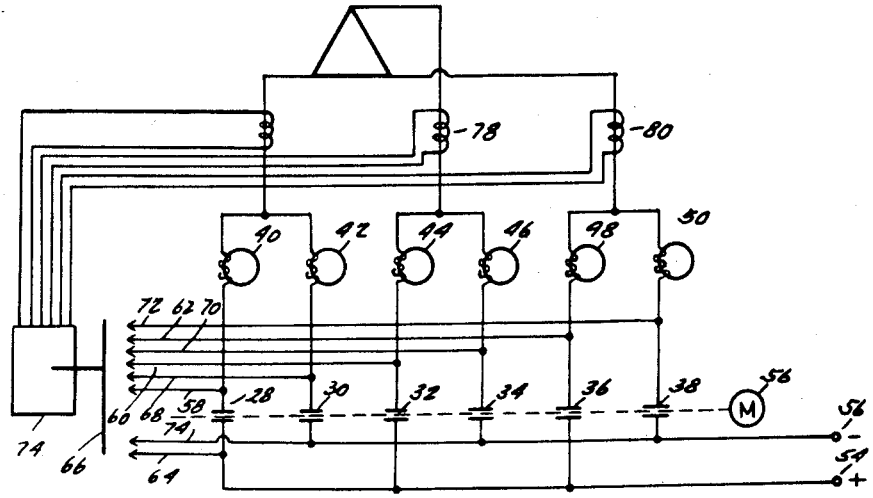

Referring now to Figure 1, there is shown a commonly used six-phase full wave rectifier circuit which comprises a main rectifier transformer 20 which is energized from a three-phase input connected to lines 22, 24 and 26. The secondary of transformer 20 is then connected to the rectifier system which includes contacts 28, 30, 32, 34, 36 and 38 and their respective commutating reactors 40, 42, 44, 46, 48 and 50.

The contacts 28 through 38 are synchronously driven, as schematically indicated, by a synchronous motor 56 in such a manner that whenever the phase voltage across the contact is positive, that contact will be closed, and whenever the phase voltage across the contact is negative, the contact will be open.

Accordingly, a D.-C. potential will be applied to the output terminals 54 and 56. For further details of the operation of this type of rectifier system, reference is herein made to the above noted application Serial No. 307,067, filed August 29, 1952, entitled Mechanical Rectifier Contacts in the name of Otto Jensen and assigned to the assignee of the instant invention.

In the event of a backfire in the rectifier system of Figure 1, it is highly desirable to short circuit all of the contacts to thereby protect them from the fault condition. In so doing this, a pair of terminals are connected across each side of each contact and brought into insulated relationship with respect to one another to a position adjacent a movable contact member. Thus, in Figure 1, terminals 58, 60 and 62, in conjunction with terminal 64, will cooperate with a movable contact member 66 to short circuit contacts 28, 32 and 36 respectively. In a similar manner, terminals 68, 70 and 72, on coopera-tion with terminal 74 and movable contact 66, operate to short circuit contacts 30, 34 and 38 respectively.

The movable contact 66 is operated by some desired system, such as the explosive short circuiter system of my novel invention and is schematically shown in Figure 1 as comprising the current transformers 78 and 80 which will have an output which is beyond some predetermined value responsive to a fult in their respective phase.

It is the essence of the instant invention to provide a short circuiter of the explosive type which will be positioned within the box 74 and will cause engagement of the various terminals associated with the rectifier elements by initiating the movement of a movable conductor into engagement with each other contact element.

For purposes of simplicity, the specific embodiment of my novel invention is of the type which has six input terminals to the short circuiter rather than the eight shown in Figure 1.

Referring now to the exploded perspective view of Figures 2 and 5, the input rectifier terminals 82, 84, 86, 88, 89 and 90 are connected to short circuiter terminal numbers 92, 94, 96, 98, 100 and 102 respectively. As may be best seen in Figure 5, the terminals members 82 through 89 are connected to sections 92 through 102 by a bolt means which protrudes through an aperture in terminal segments 92 through 102 and into engagement with a cooperating thread tapped into the right-hand end of each of terminals 82 through 90. Thus, in Figure 5, bolts 104, 106 and 108 cooperate with terminal sectors 98, 100 and 102 respectively, and are terminated in terminals 88, 89 and 90 respectively so as to maintain the terminal and its cooperating terminal sector in rigid mechanical and electrical engagement.

This is further seen in Figure 7 specifically for the case of terminal 82 which is rigidly secured to the terminal segment 92 by means of a bolt 110, the head of which is sunken into a counterbore in terminal segment 92.

In order to rigidly support the terminal segments 92 through 102 in rigid insulating relationship, a first and second insulator ring 112 and 114 (see Figures 5 and 7) are positioned on either side of the segments which lies in one plane and form a circular opening at the center of the plane, and are thereafter clamped together by means of bolts 116, 118, 120, 122 and 124 which pass through apertures in insulator ring 112, thence through the spaces between the various terminal segments and then through the insulator ring 114 to subsequently terminate in the housing 126, as is best seen in Figure 7 for the case of fastening member 116.

In order to further re-enforce the assembly of conductive terminal segments 92 through 102, an insulating ring 130, as seen in Figures 5 and 7, is positioned around the periphery of the segments and their insulator supports 112 and 114, and a metallic cylinder 132 is thereafter clamped around the insulator cylinder 130 to achieve sufficient structural strength for the peripheral support of the segments.

In order to achieve the desired short circuiting of electrical equipment connected to terminals 82 through 90 internally positioned housing inserted in the opening formed by terminal segments 92 through 102 may be expanded at some desired time to achieve this interconnection.

This short circuiter element is, in accordance with my novel invention, constructed of a cartridge filled with an explosive material which is detonated responsive to a fault condition so as to cause its outer walls to expand into contact with the various terminal segments shown in Figures 2, 5 and 7, and as further seen in the front view of Figure 8.

Figure 4:
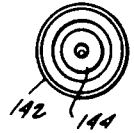
Figure 4 is a top plan view of the explosive cartridge of Figure 3.
Figure 3:
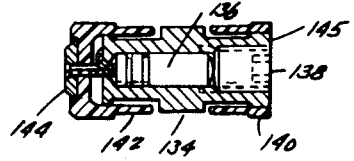
Figure 3 is a side cross-sectional view of an explosive cartridge which may be used in conjunction with Figure 2 and in accordance with my novel invention.

This explosive cartridge is best seen in Figures 3 and 4 as comprising an expansible body 134 constructed of conductive material. Expansible body 134 has a cylindrical opening therein which can receive an explosive charge which could be contained within the blasting cap 136.

The blasting cap 136 is maintained within the expansible body 134 by means of a plug 138 which is in essence a set-screw device threaded into cooperating threads in the expansible body 134 after insertion of the blasting cap 136. The left hand portion of the expansible body 134 is contained within a removable insulating sleeve 142, while the right hand portion of the explosive cartridge is held within an insulating cap 140.

At the top of the insulating cap 142 is a conductive slug 144 which is connected to one terminal of the blasting cap 136, the other terminal of blasting cap 136 being connected directly to the conductive material of expansible body 134.

Hence the central flanged portion wherein the conductive material of the expansible body is exposed, the conductive slug 144, on the left hand side and the bottom portion 145 on the right hand side are exposed to cooperating contact numbers.

In utilizing the explosive cartridge of Figures 3 and 4 in conjunction with the terminal sectors or segments set forth in Figures 2, 5, 7 and 8, the explosive cartridge is positioned centrally with respect to the circular opening formed by the terminal segments, as may be best seen in Figures 2, 7 and 8.

More specifically, Figures 7 and 8 show the insulating ring 112 as having an O-ring 146 positioned therein which engages the insulating cap 142 of the explosive cartridge while the insulating sleeve 140 is supported completely within the central opening of insulator ring 114. Thus, the exposed conductive walls of the expansible body 134 are maintained in a disengaged position with respect to each of the cooperating terminal segments 92 through 102, as is clearly seen in Figure 8.

A typical spacing which would be altered depending upon the characteristics of the blasting cap and the wall thickness of the expansible body would be $25/1000$ of an inch between the outer exposed surface of the expansible body and the surface of each of the respective terminal segments 92 through 102.

Figure 7A:
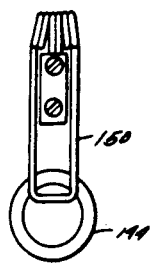
Figure 7a is a fragmentary side view of Figure 7 and illustrates the manner in which a contact spring engages the explosive cartridge whereby the explosive cartridge may be detonated responsive to an electrical signal applied to said contact spring.

In order to achieve firing of the explosive cartridge of Figure 7, a firing terminal 148 which is supported from the insulator 112 has an extending contact spring 150 (see Figure 7a) which bears into contact engagement with respect to the contact slug 144 of the explosive cartridge.

The electrical circuit may then be completed by means of an operating ram to be described hereinafter which bears against the right hand side of the cartridge of Figure 3, the operating ram being electrically connected to the housing which may be grounded.

Clearly, when the blasting cap 136 (Figure 3) is detonated through a signal applied to terminal 148, the expansible body 134 will expand, as is seen in Figure 13 so as to drive the exposed walls of expansible body 134 into engagement with each of the terminal sectors 92 through 102 and achieve the desired short circuiting action.

The amount of energy which can be stored within the explosive powder is appreciable so that the time required to achieve the expanded condition of the cartridge and thus short circuiting of the various terminals may take place within a fraction of a millisecond after the detonating signal is received.

Thus, my novel explosive type short circuiter will operate with a very minimum of time delay to thereby achieve the most efficient protection for the equipment connected at the various output terminals 82 through 90.

While it would be possible to remove an expanded cartridge from the various contact segments manually and insert a new cartridge after operation of the short circuiter, it is desirable to make this an automatic operation which requires substantially no maintenance. To this end, I have provided a novel motor operated system wherein an expended cartridge is automatically ejected and a new cartridge is taken from a cartridge storing magazine and inserted in position with respect to the various terminal segments.

In my novel automatic reloading system, a plurality of explosive cartridges 151, 153, 155 and 157, as seen in Figure 7, are stored in a magazine formed by side walls 158 and 160, as shown in Figure 6, and a back wall 162 and a front wall including member 164 and a portion of the surface of insulator ring 114, as seen in Figure 7.

The side walls 158 and 160 are further shown in the exploded perspective view of Figure 2, and as can be seen in Figure 7, the magazine is positioned to allow a single cartridge to drop into a channel where it may be later axially moved into position within the opening formed by the terminal sectors 92 through 102.

In order to insure that the explosive cartridges are correctly positioned within the magazine, interference pieces 166 and 168 are fastened to side walls 158 and 160, as seen in Figures 6 and 10, these interference pieces having projecting portions 170 and 172 respectively. Projecting portions 170 and 172 project into the depression formed in the expansible body when the insulating sleeve 140 is removed, so that only when the blasting cap is placed with the member 144 to the left in Figure 10 may the explosive cartridge be inserted in the magazine.

In order to automatically drive a new cartridge into short circuiting position and to eject an expanded cartridge, I have provided a ram mechanism which bears on the new cartridge and utilizes the new cartridge to eject the old one, and at the same time move the new cartridge into its position. This mechanism is most clearly understood when taken in conjunction with Figures 2, 7, 11 and 12 where it is seen that a motor 174 having an output shaft 176 is connected to the ram mechanism through a gear box and a system of levers so that rotation of motor shaft 176 will impart a linear motion to the ram 178.

More specifically, the output shaft 176 of motor 174 is taken through a reducing gear train seen generally at 175, and has a first and second gear 180 and 182 connected thereto. First and second gears 180 and 182 engage corresponding gears 184 and 186 respectively which are pivotally supported from stationary pivotal supports schematically indicated as supports 188 and 190 respectively.

As then shown in Figures 2, 11 and 12, each of gears 184 and 186 carry pins 192 and 194 respectively which are pivotally connected to links 196 and 198 respectively. The opposite end of links 196 and 198 then connect to a pin 200 which engages the right hand end of ram 178.

Accordingly, when motor 174 is energized and shaft 176 is rotated, gears 184 and 186 are rotated whereby pins 192 and 194 are moved to the left. This leftward movement of pins 192 and 194 will cause links 196 and 198 to move the ram 178 to the right through their interconnection by pivotal pin 200 to the ram 178.

In Figure 13, the ram 178 is shown in a position where one-half of the reloading cycle is completed; that is, the ram has been withdrawn and a new cartridge 202 has dropped in the magazine while a previous explosive cartridge has been detonated to achieve the required short circuiting of the various terminals. As the cycle continues, the direction of ram movement reverses from right to left, and, as is seen in Figure 14, the new cartridge 202 is driven leftward and into engagement with the spent cartridge 134 whereby the spent cartridge is ejected from its position with respect to the terminal segments and new cartridge 202 is positioned to replace the spent cartridge 134. (During this ejection process, the contact spring 150 of Figures 7 and 7a is flexed to the left so as to allow ejection thereof.)

After this replacement, the electrical equipment may be returned to its normal service, the cartridge 202 affording short circuiting protection responsive to the operation of a fault.

Figures 2, 7, 8 and 9 further show the use of a chute 204 which receives the ejected cartridge for storage thereof, this chute 204 being supported from the housing in any desired manner. Thus, in Figure 8, after cartridge 134 is completely ejected, it will roll to the bottom of chute 204 where it can be subsequently removed at the convenience of maintenance personnel.

In inserting a new cartridge 202, as shown in Figure 14, it is clear that the ram 178 must be stopped as soon as the desired cartridge position is achieved. To this end, a microswitch such as microswitch 206 of Figures 7b and 10, may be supported from the short circuiter housing, as shown in Figure 10, with its operating roller 208 in engagement with the cam on the shaft 190.

At this microswitch position, shaft 190 is flattened as at the plate portion 210, this portion corresponding to the maximum stroke allowed for ram 178 in positioning cartridge 202. Thus, when the plate portion 210 moves into registry with respect to roller 208, the microswitch 206 will be operated so as to de-energize motor 174 and, if desired, apply some type of brake to the output shaft of the motor, and thus prevent the ram 178 from over-travelling.

This control circuit may be of any well known type of motor control circuit, and for that reason will not be further described herein.

Upon operation of the new cartridge, the motor 174 is either automatically re-energized to complete a second cycle and thus load a new cartridge in position, or, if desired, the motor may be manually operated for each reloading operation.

If desired, microswitch means may be provided in any desired manner to indicate the ejection of a detonated cartridge by setting off an alarm means.

Furthermore, a spring based plunger could be utilized to keep a new cartridge from dropping into the ram chamber until the ram is completely withdrawn, thus preventing the cartridge from being tilted and causing the motor to jam during the ejection cycle.

Although I have described preferred embodiments of my novel invention, many variations and modifications will now be obvious to those skilled in the art, and I prefer therefore to be limited not by the specific disclosure herein but only by the appended claims.

I claim:

1. In a short circuiter comprising a plurality of relatively stationary terminals to be connected to one another responsive to a predetermined condition and a movable contact for interconnecting each of said relatively stationary contacts; each of said relatively stationary contacts being positioned adjacent said movable contact; an explosive charge associated with said movable contact, said movable contact being driven into contact engagement with each of said stationary contacts responsive to detonation of said explosive charge; said movable contact comprising an expansible conductive housing having said explosive charge positioned therein; said plurality of stationary contacts being positioned in a single plane surrounding said conductive housing and having one portion terminated adjacent to said conductive housing; the walls of said housing deflecting into engagement with each of said plurality contacts responsive to said detonation; and automatic motor driven means for ejecting said conductive housing after detonation of its said explosive and for positioning a new movable contact element in place.

2. In a short circuiter comprising a plurality of relatively stationary terminals to be connected to one another responsive to a predetermined condition and a movable contact for interconnecting each of said relatively stationary contacts; each of said relatively stationary contacts being positioned adjacent said movable contact; an explosive charge associated with said movable contact, said movable contact being driven into contact engagement with each of said stationary contacts responsive to detonation of said explosive charge; and automatic motor driven means constructed to eject said movable contact after operation thereof and to replace said movable contact by a new movable contact having a new explosive charge associated therewith.

3. A contact device comprising a first and second relatively stationary contact positioned adjacent a third contact adapted to cooperate with said first and second contacts; said third contact having an explosive charge associated therewith for moving said third contact into contact engagement with respect to said first and second contacts responsive to detonation of said explosive charge; said third contact comprising an expansible conductive housing having an explosive charge positioned therein; the walls of said expansible housing deflecting into engagement with said first and second contacts responsive to said detonation; an automatic motor driven means for ejecting said contact device after detonation of its said explosive charge and for positioning a new contact device in place.

4. In a short circuiter comprising a plurality of relatively stationary terminals to be connected to one another responsive to a predetermined condition and a movable contact for interconnecting each of said relatively stationary contacts; each of said relatively stationary contacts being positioned adjacent said movable contact; an explosive charge associated with said movable contact, said movable contact being distorted into contact engagement with each of said stationary contacts responsive to detonation of said explosive charge; said movable contact comprising an expansible conductive housing having said explosive charge positioned therein; an automatic motor driven means for ejecting said movable contact after detonation of its said explosive charge and for positioning a new movable contact in place.

References Cited in the file of this patent

UNITED STATES PATENTS

| | | |
|---|---|---|
| 723,183 | Read | Mar. 17, 1903 |
| 818,290 | Read | Apr. 17, 1906 |
| 1,092,510 | Allendorf | Apr. 7, 1914 |
| 2,480,553 | Cooper et al. | Aug. 20, 1949 |